United States Patent
Mital et al.

(10) Patent No.: US 7,730,182 B2
(45) Date of Patent: Jun. 1, 2010

(54) SYSTEM AND METHOD FOR INTEGRATING MANAGEMENT OF COMPONENTS OF A RESOURCE

(75) Inventors: Vijay Mital, Sammamish, WA (US); Maarten Mullender, Duvall, WA (US); Ulrich Homann, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1419 days.

(21) Appl. No.: 10/648,506

(22) Filed: Aug. 25, 2003

(65) Prior Publication Data
US 2005/0050199 A1  Mar. 3, 2005

(51) Int. Cl.
*G06F 15/173* (2006.01)
*G06F 17/25* (2006.01)

(52) U.S. Cl. .................. 709/226; 709/225; 715/217; 715/234

(58) Field of Classification Search .......... 709/225, 709/226; 715/217, 234
See application file for complete search history.

(56) References Cited

U.S. PATENT DOCUMENTS

| | | | | |
|---|---|---|---|---|
| 5,111,391 | A | 5/1992 | Fields et al. | 364/401 |
| 6,957,192 | B1 * | 10/2005 | Peth | 705/38 |
| 2003/0083917 | A1 * | 5/2003 | Tracey et al. | 705/7 |
| 2003/0097364 | A1 * | 5/2003 | Bata | 707/100 |
| 2003/0135609 | A1 * | 7/2003 | Carlson et al. | 709/224 |
| 2004/0019560 | A1 * | 1/2004 | Evans et al. | 705/40 |
| 2005/0021355 | A1 * | 1/2005 | Brendle et al. | 705/1 |

FOREIGN PATENT DOCUMENTS

| | | |
|---|---|---|
| WO | WO 01/24084 A2 | 4/2001 |
| WO | WO 01/84301 A2 | 11/2001 |

OTHER PUBLICATIONS

Emmerich, W. et al., "TIGRA-An Architectural Style for Enterprise Application Integration", *IEEE*, 2001, 567-576.
Fremantle, P. et al., "Enterprise Services-Examining the Emerging Field of Web Services and How it is Integrated into Existing Enterprise Infrastructures", *Communications of the ACM*, Oct. 2002, 45(10), 77-82.
Gokhale, A. et al., "Applying Model Integrated Computing to Component Middleware and Enterprise Applications", *Communications of the ACM*, Oct. 2002, 45(10), 65-70.
Lee, J.L. et al., "Enterprise Integration with ERP and EAI", *Communications of the ACM*, Feb. 2003, 46(2), 54-60.
Sutherland, J. et al., "Enterprise Application Integration and Complex Adaptive Systems", *Communications of the ACM*, Oct. 2002, 45(10), 59-64.

* cited by examiner

*Primary Examiner*—Rupal D Dharia
*Assistant Examiner*—Lin Liu
(74) *Attorney, Agent, or Firm*—Woodcock Washburn LLP (57) ABSTRACT

An application entity may be created and defined by a user at an application. Related service entities managed by different service applications may be matched and consolidated. The application entity may be associated with one or more related service entities. Metadata corresponding to the associated service entities may be provided to the application. Such metadata may enable the associated service entities to be managed from within the application.

21 Claims, 10 Drawing Sheets

(Prior Art)

John Smith has missed a credit card payment

SYSTEM AND METHOD FOR INTEGRATING MANAGEMENT OF COMPONENTS OF A RESOURCE

FIELD OF THE INVENTION

The present invention relates to the field of resource management and, more specifically, to integrating resource management between application services and applications.

BACKGROUND OF THE INVENTION

In conventional resource management systems, application services typically function in connection with applications. Such application services may each manage different components of a resource. For example, two application services may manage different components of a loan approval process. Specifically, a first application service may manage a credit history component of the loan approval process, while a second application service may manage a down payment component of the loan approval process. Each of the application services may manage related service entities associated with the loan approval process. For example, the first application service may mange "applicant" service entities, while the second application service may manage related "loan" service entities.

Applications functioning in connection with the application services may be, for example, electronic mail applications, word processing applications, or spreadsheet applications that enable the production of documents. Such documents may often refer to service entities and influence the management of the service entities at the application services. For example, a document may include the text, "John Smith has missed a credit card payment." "John Smith" may be an instance of both the applicant entity managed by the first application service and the loan entity managed by the second application service. Thus, the document may influence the management of the applicant entity "John Smith" and the loan entity "John Smith". Specifically, the document may influence a user to change the state of the applicant entity "John Smith" at the first application service to a "deny loan" state. The document may also cause the state of the loan entity "John Smith" at the second application service to be changed to a "refund down payment" state.

Although documents may often influence the management of service entities at the application services, there is generally limited ability to access, query, and manage service entities from within an application. For example, if the document influences a user to change the state of applicant entity "John Smith" at the first application service, then, to change the state, the user must access the first application service and identify the applicant service entity at the first application service. It may often be difficult, however, to identify a service entity at a application service because a document often does not provide sufficient semantics about attributes by which the service entity is defined. For example, while the document refers to the loan applicant "John Smith" by his full name, the first application service may define the applicant service entity by separate "first name" and "last name" attributes.

The limited ability to access, query, and manage service entities from within an application is particularly cumbersome when a document influences the management of related entities from different application services. For example, if the document causes a user to change the state of applicant entity "John Smith" at the first application service and to change the state of loan entity "John Smith" at the second application service, then the user must separately access each application service and separately identify each service entity at each application service. Separately identifying of service entities at different application services is cumbersome because, even if the different service entities are related, the service entities may be defined at each application service by different sets of attributes. For example, while the first application service may define the applicant service entity by separate "first name" and "last name" attributes, the second application service may define the loan entity by an "applicant" attribute rather than by a name attribute.

Another difficulty relating to the management of service entities in conventional resource management systems is that an application typically provides limited information about the availability of actions which can be performed on service entities at the application services. Specifically, each application service may have specific rules and conditions related to the performance of actions on service entities. For example, such rules and conditions may include a maximum number of times which an action may be performed, a period in which an action must be performed, a limited user or class of users which may perform an action, or a condition which must occur before or after the performance of an action. An application generally cannot determine what such rules and conditions are and whether they are satisfied. Thus, a user must access each component process to determine if an action is available within the process.

Additionally, an application typically has limited abilities to coordinate the management of resources among multiple users according to such rules and conditions. Specifically, an application has limited ability to track the performance of actions and to prevent or advise against the performance of actions that are invalid or likely to generate conflicts. Furthermore, applications typically have limited ability to provide users with information about relationships between entities and processes managed by different application services and the performance of actions on such related entities by other users. Such information may be used to determine the availability of an action and to protect against conflicts related to the performance of the action.

Thus, there is a need in the art for systems and methods for integrating resource management between application services and applications. It is desired that such systems and methods enable, for example, matching of related service entities from different application services, association of service entities with documents, and management of service entities from within an application.

SUMMARY OF THE INVENTION

Application services maintain service metadata corresponding to service entities. The application services may provide such service metadata to a context service and to an action service. The context service may match related service entities based on the service metadata. The context service may consolidate such related service entities into context entities. The context service may consolidate service metadata corresponding to such related service entities into context metadata.

An application maintains application metadata corresponding to application entities. When an application entity is selected at the application, an execution service may retrieve application metadata corresponding to the selected application entity and provide such application metadata to the context service.

The context service may match the selected application entity to associated context entities based on the application metadata and the context metadata. The context service may identify associated service entities from which the associated context entity is derived. The context service may provide service metadata corresponding to the associated service entities to the execution service. The execution service may generate a display of the provided service metadata which may be used to mange the associated service entities at the application.

In an embodiment of the invention, the application services may classify the availability of actions to be performed on service entities at the application services. The actions may be classified as optimistically available, available according to a rule, or universally available. The classifications may be provided to the action service, and the action service may use the classifications to determine the availability of actions on associated service entities. The action service may include a tracking mechanism to track the performance of actions. The action service may also include a conflict protection mechanism which uses data from the tracking service in combination with the classifications to determine if performance of the actions will result in a conflict. The actions available to be performed on the associated service entities may be provided to the application, and a view of the actions may be generated at the application.

Additional features and advantages of the invention will be made apparent from the following detailed description of illustrative embodiments that proceeds with reference to the accompanying drawings.

BRIEF DESCRIPTION OF THE DRAWINGS

The illustrative embodiments will be better understood after reading the following detailed description with reference to the appended drawings, in which.

DETAILED DESCRIPTION OF ILLUSTRATIVE EMBODIMENTS

I Illustrative Computer Environment

Figure 1:
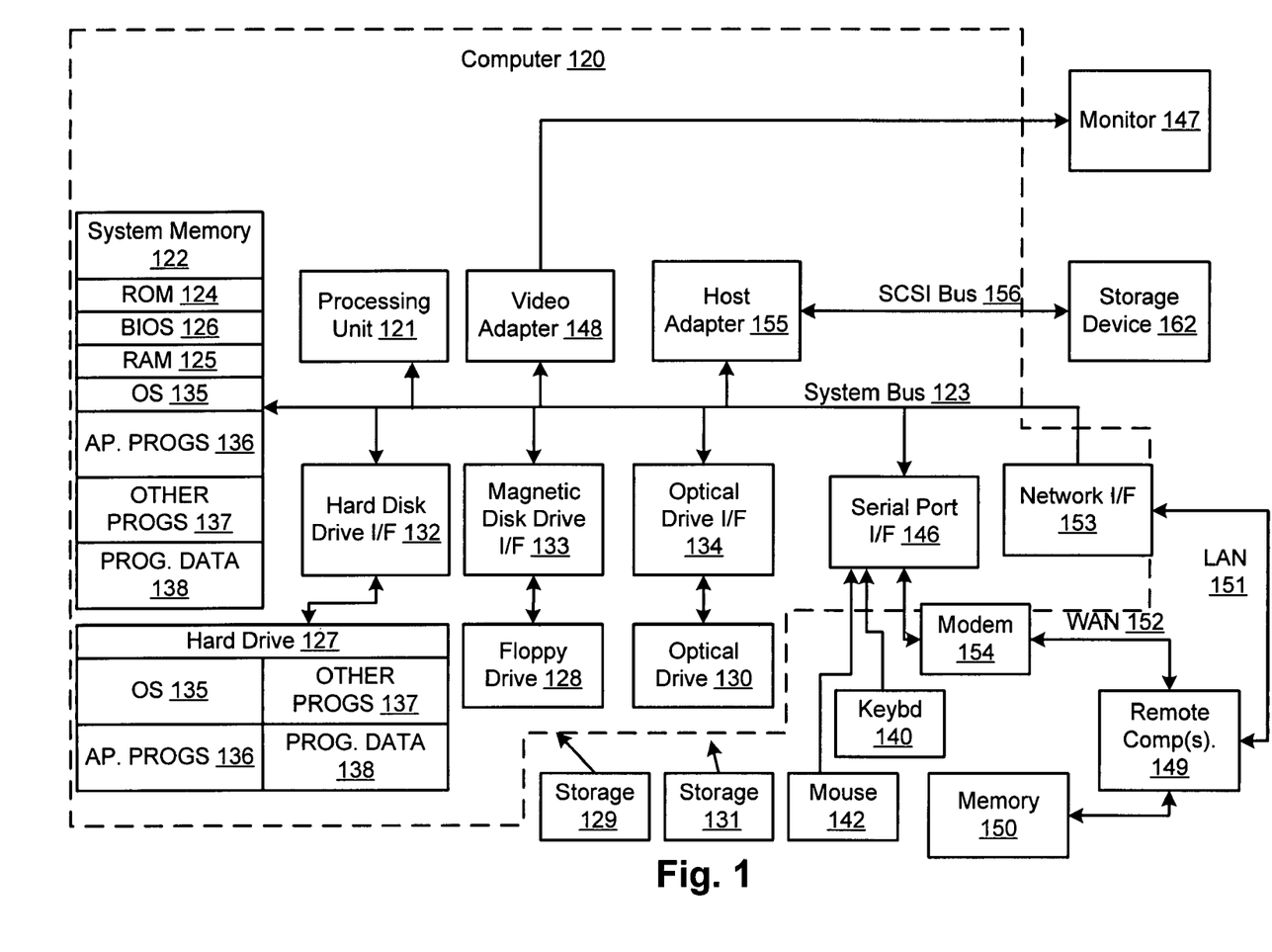
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a application service. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multiprocessor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application 212 programs 136, other program modules 137 and program data 138. A user may enter commands and information into the personal computer 120 through input devices such as a keyboard 140 and pointing device 142 such as a mouse. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers.

The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a application service, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

II Illustrative Resource Management Environment

Figure 2:
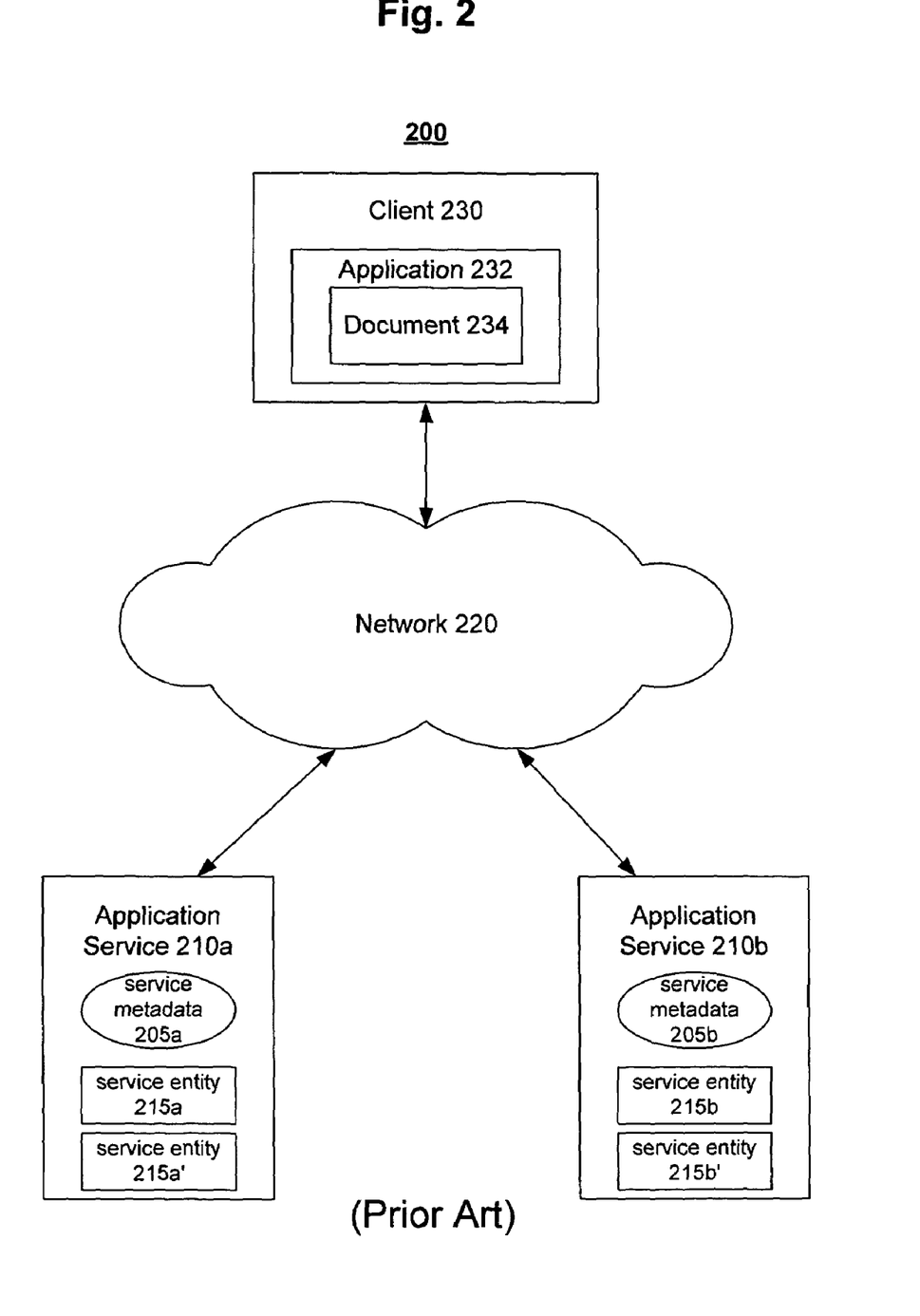
FIG. 2 is a block diagram of an exemplary prior art resource management system.

An exemplary conventional resource management system 200 is shown in FIG. 2. System 200 includes application services 210a and 210b functioning in connection with an application 232 on a client 230. Generally, application services 210 manage resources, while application 232 presents and exchanges information about such resources.

Application services 210 may be application services such as, for example, line of business (LOB) application services, database application services, network application services, print application services, and file application services. Specifically, application service 210a may be an LOB application service that manages a credit history component of a loan approval process, while application service 210b may be an LOB application service that manages a down payment component of a loan approval process.

Figure 3A:
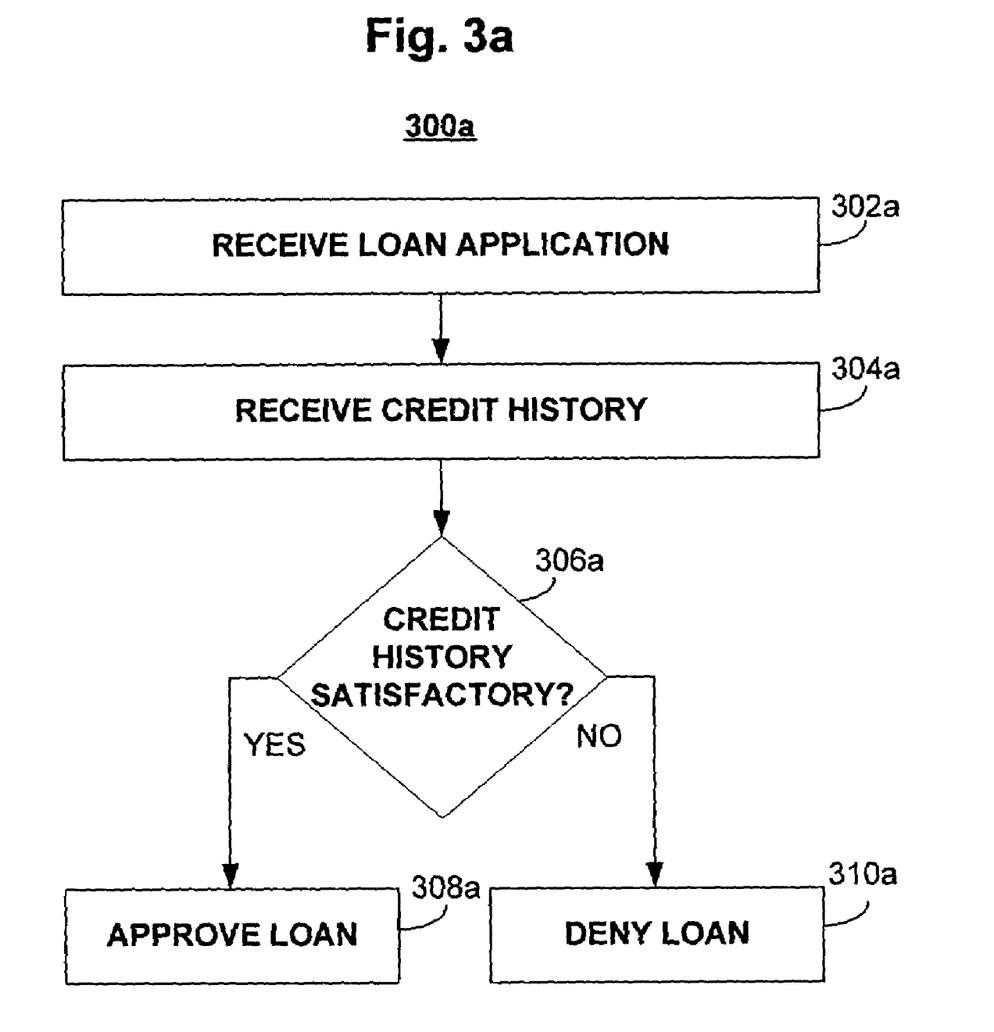
FIGS. 3a and 3b are flow diagrams of exemplary business processes.

An exemplary credit history component process 300a managed by application service 210a is shown in FIG. 3a. At state 302a, a loan application is received. At state 304a, a credit history is received. At state 306a, it is determined if the credit history is satisfactory. If the credit history is satisfactory, then, at state 308a, the loan is approved. If the credit history is not satisfactory, then, at state 310a, the loan is denied.

Figure 3B:
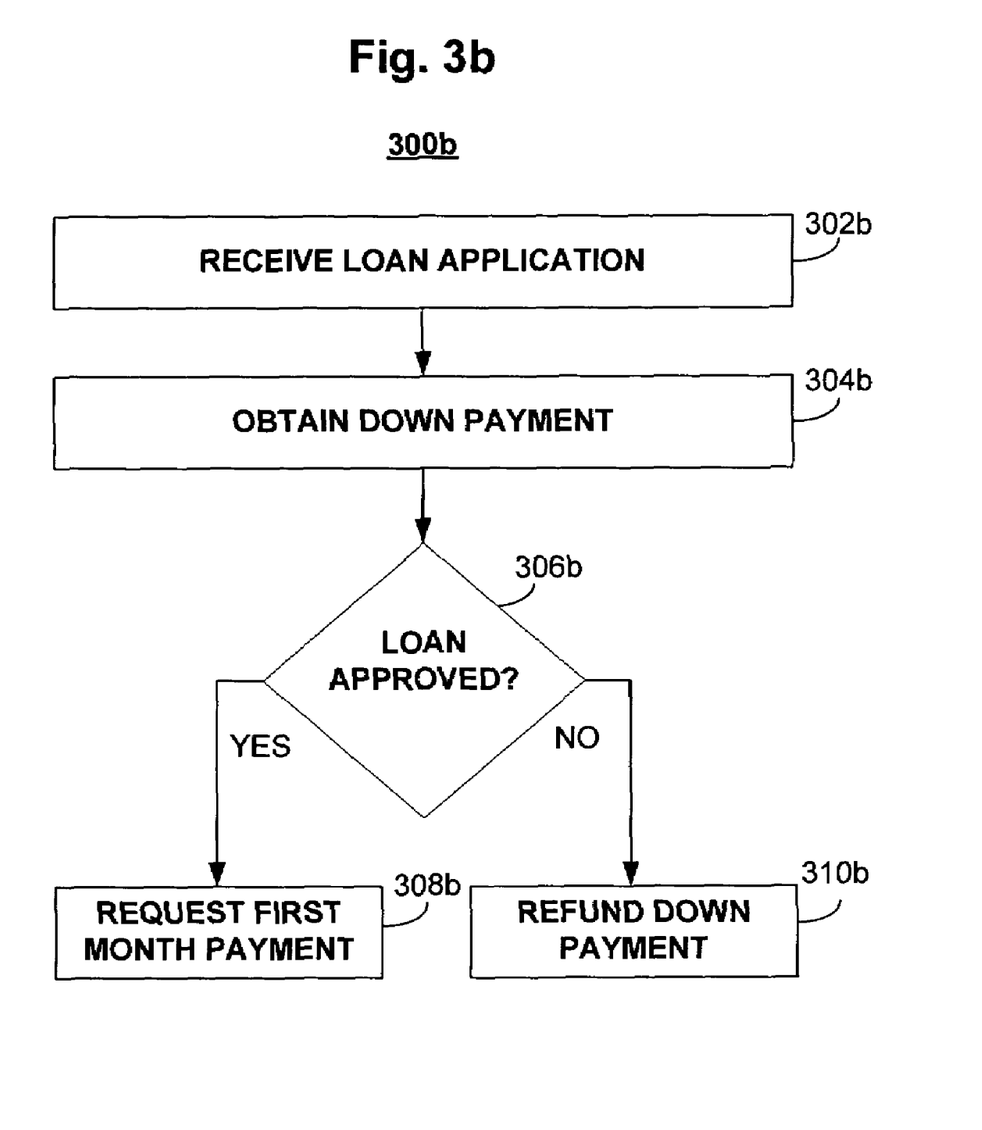

An exemplary down payment component process 300b managed by application service 210b is shown in FIG. 3b. At state 302b, a loan application is received. At state 304b, a down payment is requested. At state 308a, it is determined if the loan is approved. If the loan is approved, then, at state 308b, the first monthly payment is requested. If the loan is not approved, then, at state 310b, the down payment is refunded.

Application services 210 manage service entities 215 associated with component processes 300. Application service 210a manages service entities 215a and 215a', while application service 210b manages service entities 215b and 215b'.

Specifically, service entity 215a may be an "applicant" entity associated with credit history component process 300a, while service entity 215b may be a related "loan" entity 215b associated with loan approval process 300b. Service entities 215a' and 215b' may be non-related service entities that are specific to each component process 300a and 300b, respectively.

Application services 210 may maintain service metadata 205 corresponding to such service entities 215. Service metadata 205 may be defined in a language such as, for example, extensible markup language (XML). Service metadata 205 may include attributes of the service entities 215 and may also include unique keys of the service entities 215. Exemplary attributes of the applicant entity 215a and the loan entity 215b are shown below:

| Exemplary Applicant Entity 215a |
|---|
| <applicant><br>    <ID> 1 </ID><br>    <first name> John </first name><br>    <last name> Smith </last name><br></applicant> |

| Exemplary Loan Entity 215b |
|---|
| <loan><br>    <ID> 10 </ID><br>    <applicant><br>        <name> John Smith </name><br>    </applicant><br></loan> |

Service metadata 205 may also include actions available on service entities 215. Such actions may be static actions, which are available irrespective of the process state of service entities 215, or dynamic actions, which are dependent on the process state of service entities 215.

Static actions may be actions such as, for example, actions for viewing and changing the attributes of service entities 215, actions for following or drilling down a relationship to see related instances, and always available actions for changing the process state. Metadata for viewing and changing attributes may include, for example, mechanisms rendering a view such as launching a dialog.

Metadata for dynamic actions may include methods for changing the process state, functions of the process state in which such methods are available, and restrictions on protecting the process from multiple or conflicting use of such methods by the same or different users.

Service metadata 205 may also include information about access to service entities 215. Such metadata may include, for example, access limitations or restrictions for a particular user or group of users to an instance or class of service entities 215, static action, or relationship. Authorization such as, for example, a valid password or identifier may be required to gain access to each such instance or class of an entity, static action, or relationship.

Service metadata 205 may also include descriptions of methods to obtain information about entity instances. Such metadata may also include descriptions of methods to derive actual or possible relationships between entity instances, views, and static actions.

Application services 210 communicate with client 230 via network 220. Network 220 may be a local area network (LAN) or a wide area network (WAN) such as, for example, the Internet. Client 230 may be a computing device such as computing device 120 of FIG. 1. Client 230 may be equipped with a web browser or another front end application to gain access to application services 210. Application 232 runs at client 230 and may be an application such as, for example, a word processor, a spreadsheet, or an email system. Application 232 may enable a document 234 to be created, presented, and exchanged among users.

Figure 4:
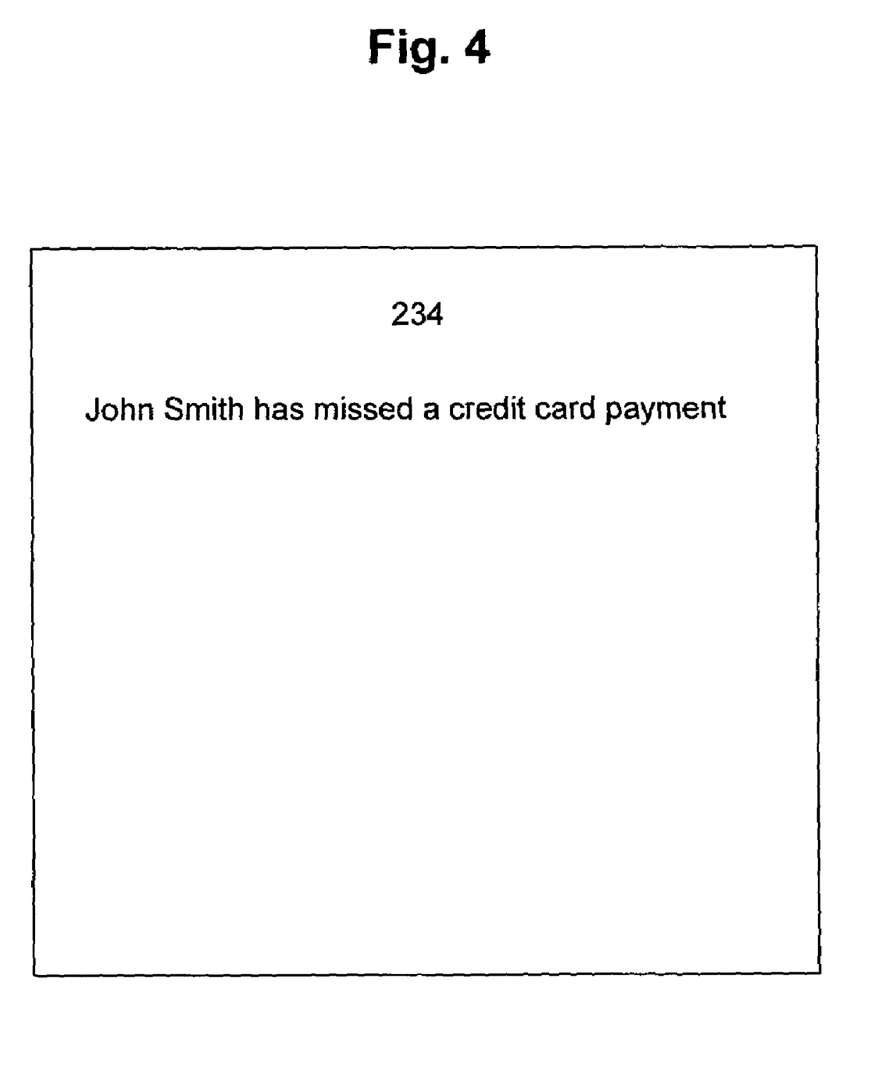
FIG. 4 shows an exemplary document.

Document 234 may refer to and influence the management of service entities. Referring now to FIG. 4, document 234 includes the text, "John Smith has missed a credit card payment." Document 234 thus refers to both the applicant service entity 215a and the loan service entity 215b. Document 234 may influence the management of such referred service entities 215a and 215b. For example, document 234 may influence a user to change the state of applicant service entity "John Smith" 215a from state 306a to state 310a. Document 234 may also influence a user to change the state of loan service entity "John Smith" 215b from state 306b to state 310b.

Importantly, in a conventional system 200 as shown in FIG. 2, a user cannot manage service entities 215 from within application 232. Thus, to change the state of applicant service entity 215a, the user must separately access application service 210a and identify applicant service entity 215a within application service 210a. Furthermore, to change the state of loan service entity 215b, the user must separately access application service 210b and identify the loan service entity 215b within application service 210b.

III Exemplary Systems and Methods of the Present Invention

Unlike conventional system 200 of FIG. 2, the present invention enables application entities to be created and defined by a user. The present invention also enables related service entities to be matched and consolidated. Each application entity may be associated with one or more related service entities. Metadata corresponding to the associated service entities may be provided to the application. Such metadata may enable the associated service entities to be managed from within the application.

Figure 5:
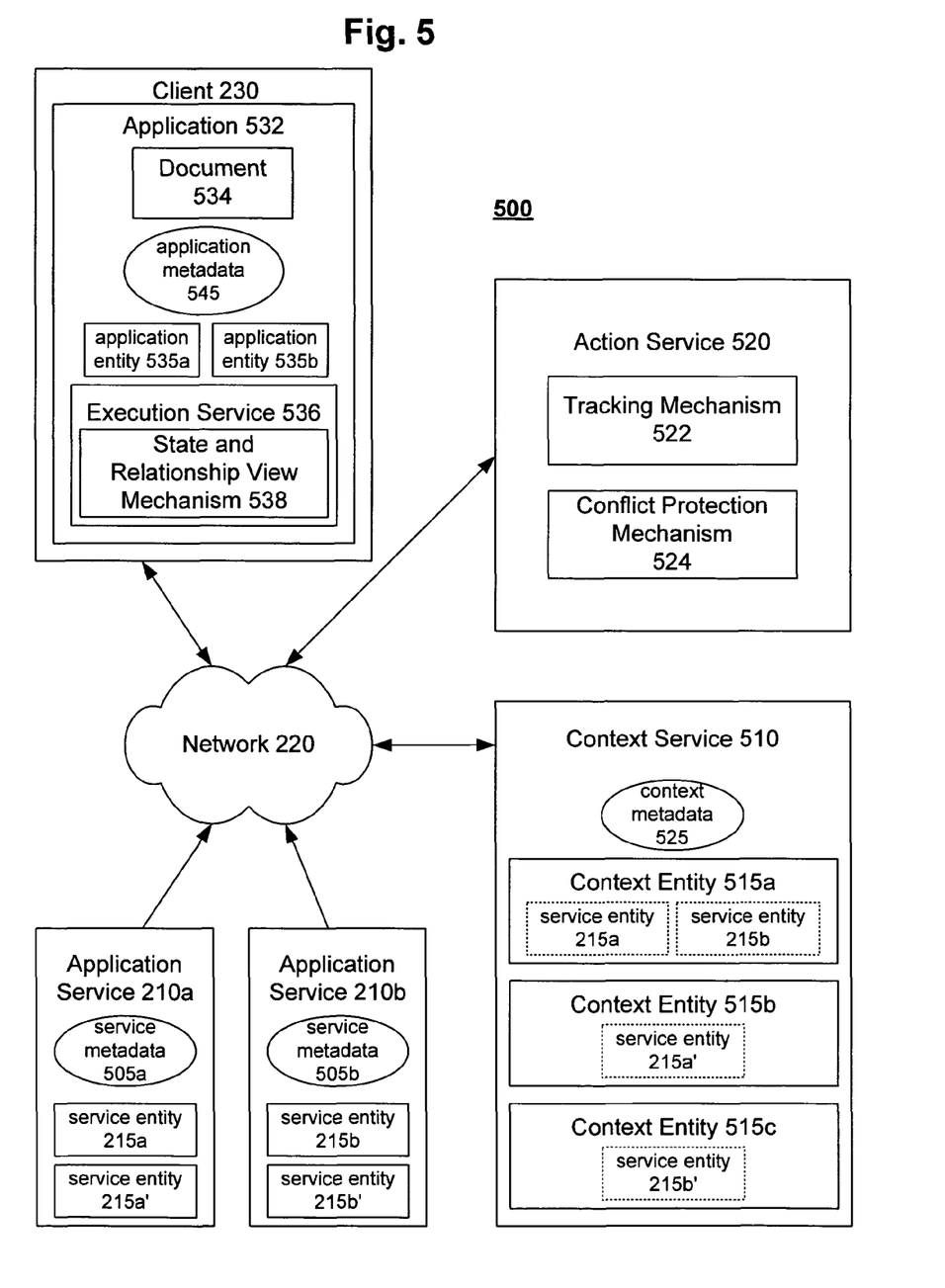
FIG. 5 is a block diagram of an exemplary resource management system in accordance with the present invention.

An exemplary resource management system 500 in accordance with the present invention is shown in FIG. 5. Generally, application services 210 expose service metadata 505 corresponding to service entities 215 to context service 510 and action service 520. Context service 510 consolidates service entities 215 into context entities 515 based on service metadata 505. Context service 510 also consolidates service metadata 505 into context metadata 525. Action service 520 determines dynamic actions available on service entities 215. Application 532 maintains application metadata 545 corresponding to application entities 535.

Application services 210 expose service metadata 505 to context service 510 via network 220. Unlike conventional service metadata 205 of FIG. 2, service metadata 505 in accordance with the present invention may include a classification of the availability of actions to be performed in connection with service entities 215. Specifically, application services 210 may classify an action as being universally available, optimistically available, or available according to a rule.

An action that is universally available is an action that may be always be performed. Such actions are not subject to any rules or conditions.

An action that is optimistically available is available subject to specified rules and conditions. For example, such rules may include a maximum number of times which an action may be performed, a time period in which an action must be performed, a user or class of users which must perform an action, a condition which must occur before performance of an action, a condition which must occur after performance of an action. Classifying an action as optimistically available enables application services 210 to make an action available without specifying all possible rules and conditions which must be satisfied for the rule to be available.

An action that is available according to a rule is available only in compliance with specified rules and conditions. Classifying an action as available according to a rule enables application services 210 to deny the availability of action unless specified rules and conditions are satisfied.

Context service 510 may be an application running on a computing device such as, for example, computing device 120 of FIG. 1. Context service 510 may parse service metadata 505 to identify service entities 215 and corresponding static actions available on the service entities. Context service 510 may validate service metadata 505 by, for example, making a dummy call for identified service entities to application services 210.

Context service 510 consolidates service entities 215 into context entities 515. To consolidate service entities 215, context service matches related service entities 215 and consolidates such related service entities 215 into a single context entity 515. For example, context service 510 may match related service entities 215a and 215b and consolidate them into context entity 515a. Context service 510 may also determine that service entities 210a' and 210b' are not related and may thus consolidate each of service entities 210a' and 210b' into a separate context entity 515b and 515c, respectively.

Context service 510 matches related service entities 215 based on service metadata 505. Specifically, context service 510 cross references attributes of service entities 215 to identify actual and potential relationships. Context service 510 may identify such relationships based on a nomenclature of the attributes. For example, context service 510 may match the applicant service entity 215a to the loan service entity 215b because the loan service entity 215b includes an "applicant" attribute. Context service 510 may fragment and compose attributes. Furthermore, context service 510 may perform transformations on attributes. For example, context service 510 may perform a transformation to match the "first name" and "last name" attributes of the applicant service entity 215a to the "name" attribute of the loan service entity 215b.

In addition to consolidating the service entities 215 into context entities 515, context service 510 consolidates service metadata 505 into context metadata 525. Specifically, in addition to consolidating the attributes of service entities 215, context service 510 consolidates dynamic actions available on service entities 215. For example, context service 510 may fragment and compose static actions available on service entities 215. Furthermore, context service 510 may perform transformations on static actions of service entities 215.

Context service 510 may also consolidate service metadata 505 about access to service entities 215. For example, context service 510 may persist context metadata 525 specifying that a particular class of users has access to the context entity 215a but does not have access to the context entity 215b.

Context service 510 may also consolidate metadata about entity instances and the derivation of actual or possible relationships between such instances, views, and static actions. Context service 510 may also maintain rendering information for service metadata 505. Context service 510 may also prefetch service metadata 505 from application services 210 to increase the availability of service metadata 505. Context service 510 may also store procedures for restoring service metadata 505 when application services 210 go offline such as, for example, in the event of a power failure.

Action service 520 may be an application running on a computing device such as, for example, computing device 120 of FIG. 1. Generally, action service 520 determines dynamic actions available on service entities 215. Action service 520 may query context service 510 to identify which of application services 210 have dynamic actions available on a service entity 215. Action service 520 may then query the identified application services 210 to obtain the available dynamic actions for the service entity 215.

Alternatively, action service 520 may query the identified application services 210 to obtain status information for an entity. Action service 520 may then retrieve service metadata 505 corresponding to the entity to determine the available actions for the service entity 215.

Action service 520 includes tracking mechanism 522, which tracks the performance of actions on service entities 215 at application services 210. Tracking mechanism 522 determines when a user invokes a state change method on a process and tracks the success, failure, or pending completion of the method.

Action service 520 also includes conflict protection mechanism 524, which prevents and advises against the performance of dynamic actions at application services 210 that are invalid or likely to generate conflicts. Conflict protection mechanism 524 evaluates the classification of the availability of actions to be performed on service entities 215. Specifically, as described above, such actions may be classified as universally available, optimistically available, or available according to a rule. Conflict protection mechanism 524 uses and interprets such classifications along with the actions tracked by tracking mechanism 522 to determine whether actions are available and to detect dynamic actions that may cause actual and potential conflicts.

Application 532 may be an application such as, for example, a word processor, a spreadsheet, or an email system that enables the creation, production, and exchange of a document 534. Generally, unlike conventional application 232 of FIG. 2, application 532 enables application entities 535a and 535b to be created and defined. Application 532 may maintain application metadata 545 corresponding to such application entities 535. Such application metadata 545 may include, for example, attributes of the corresponding application entities 535.

A user may define an instance of an application entity 535 by, for example, typing a name of the instance in the text of document 534, highlighting the name using an attached mouse keyboard, or the like, and selecting a "define instance" option from an application menu. The user may then, for example, select an application entity 535 from a list of pre-defined application entities 535 or create an instance of a "new" application entity 535. If the user selects a pre-defined application entity 535, then a view of the attributes of the pre-defined application entity 535 may be displayed, and the user may define attributes for the instance. If the user creates a new application entity 535, then the user may create a set of attributes for the application entity 535 and may define the set of attributes for the instance.

Once the instance of the application entity 535 has been defined, it may appear in the text of the document as a link shown by, for example, underlined and specially colored text. The user may then select the instance by, for example, clicking on the link using the attached mouse. Selecting the instance may cause the view of the attributes of the instance to be displayed.

Figure 6:
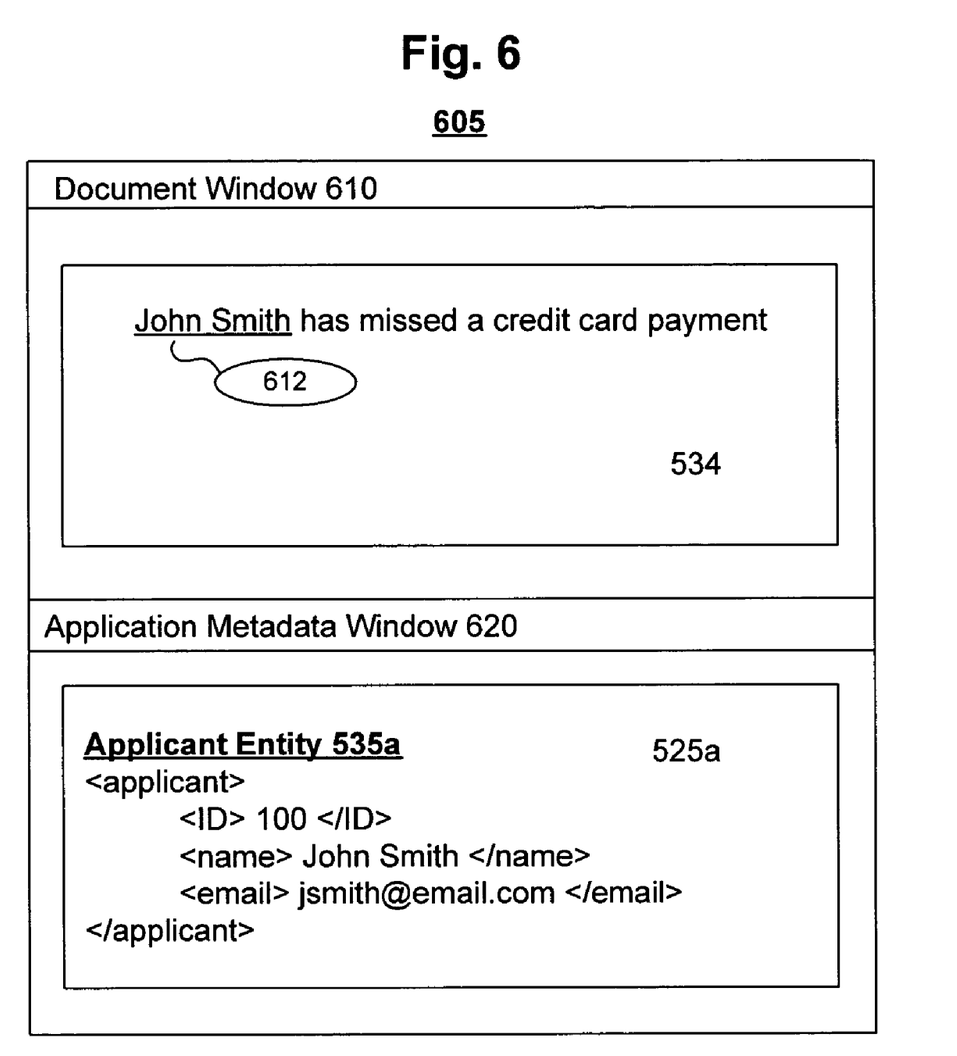
FIG. 6 shows an exemplary application user interface in accordance with the present invention.

Referring now to FIG. 6, an exemplary application user interface 605 is shown. User interface 605 may be displayed on a display device such as a monitor attached to client 230. User interface 605 includes document window 610, which displays document 534. Document 534 includes the text, "John Smith has missed a credit card payment." "John Smith" has been defined as an instance of an applicant application entity 535a as shown by link 612.

Application user interface 605 also includes application metadata window 620. Application metadata window 620 may be opened by clicking on link 612. Entity window 620 displays application metadata 545a, which includes the attributes of applicant application entity 535a. In an alternative embodiment, application metadata 545a may appear in a dialog box within document 534.

Execution service 536 at application 532 is discussed in detail below with reference to FIGS. 7a and 7b. Generally, execution service 536 provides selected application metadata 545 to context service 510. Execution service 536 also includes state and relationship view mechanism 538 for providing views of related service entities 215.

Figure 7A:
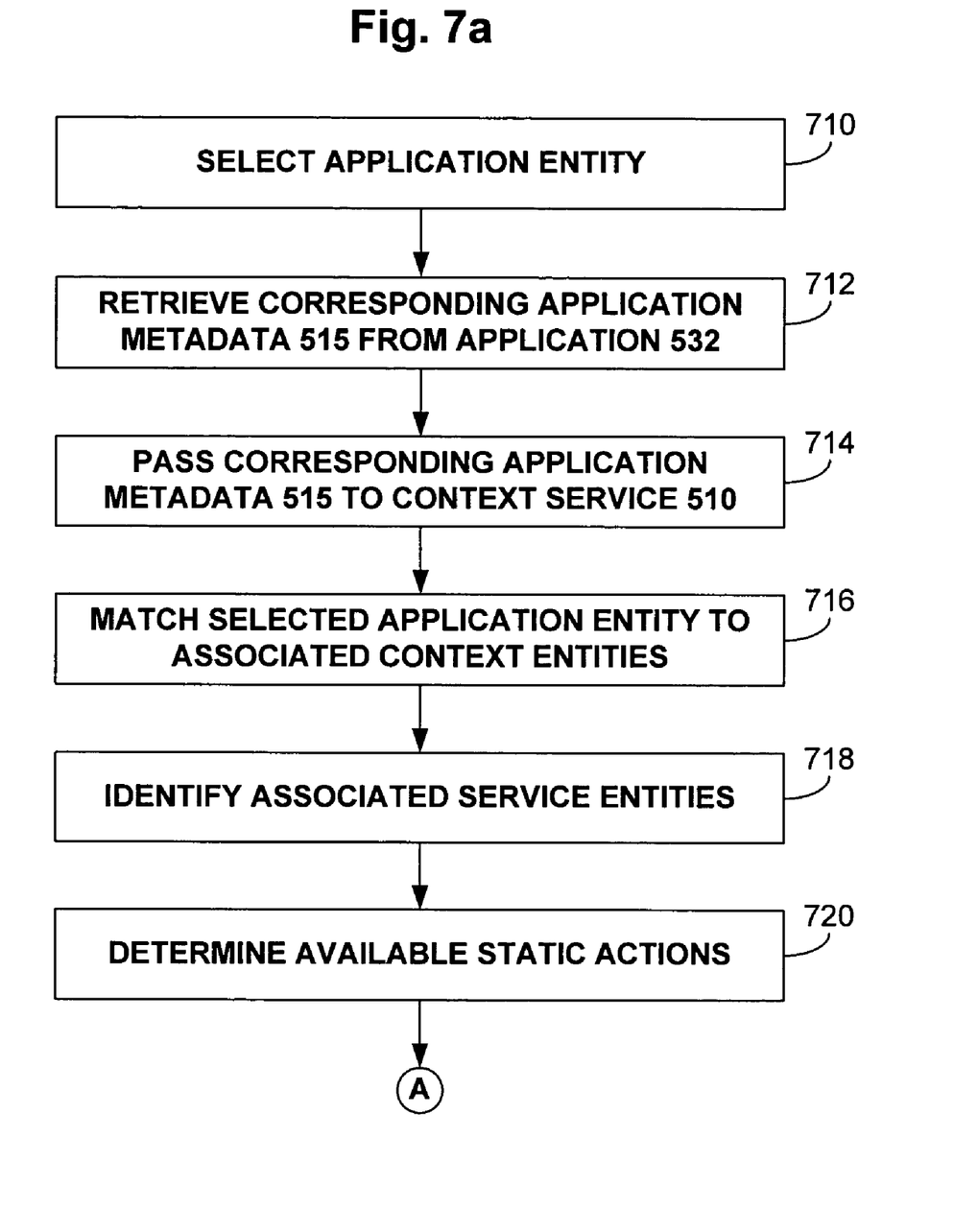
FIGS. 7a and 7b are flow diagrams of an exemplary method for managing service entities from within an application in accordance with the present invention.
Figure 7B:
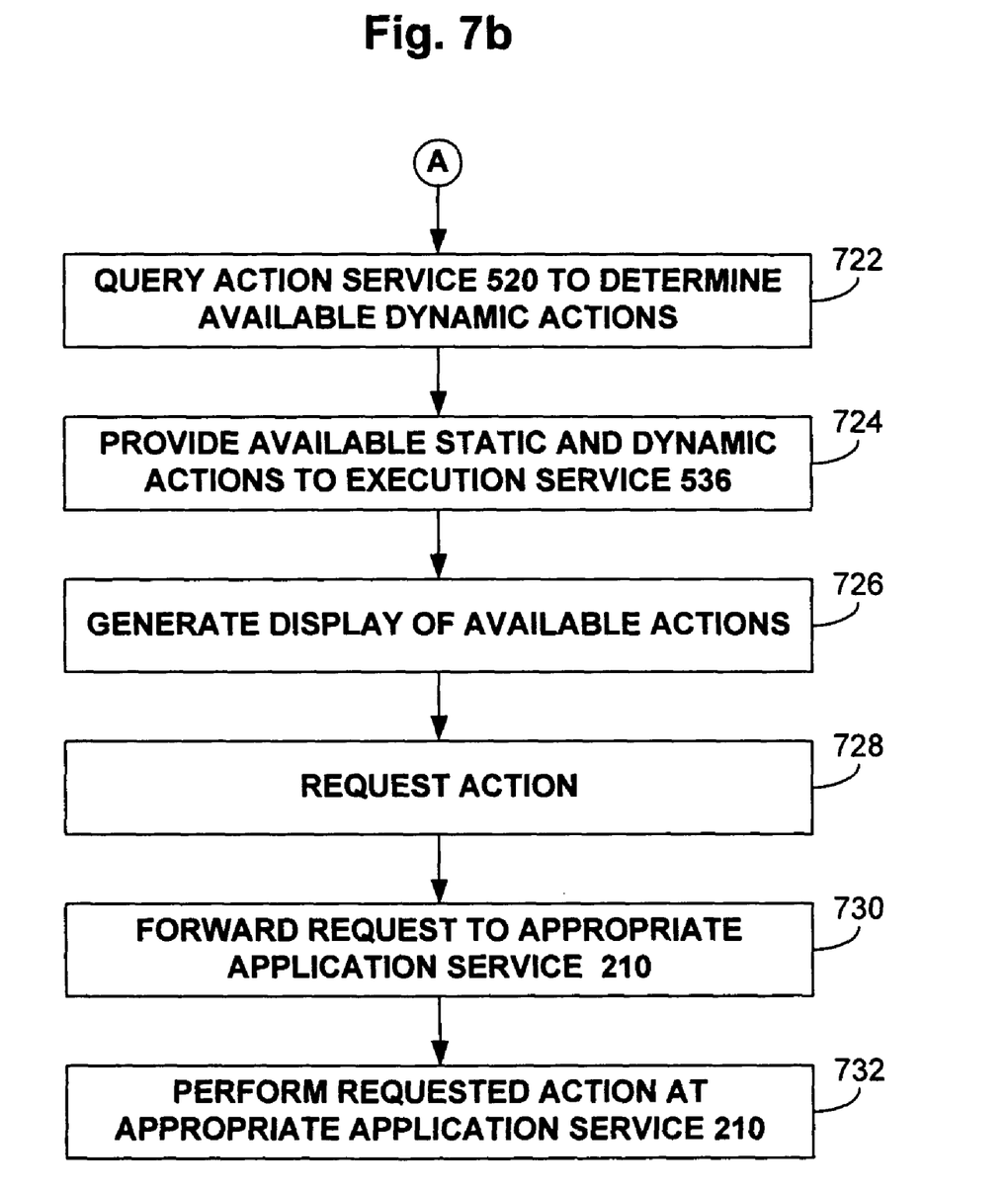

A flow diagram of an exemplary method for managing service entities 215 from within application 532 in accordance with the present invention is shown in FIGS. 7a and 7b. Generally, a selected application entity 535 is associated with service entities 215, and service metadata 505 for the associated service entities 215 is provided to application 532. The provided service metadata 505 enables the associated service entities 215 to be managed from within the application 532.

At step 710, an application entity 535 is selected at application 532. For example, the applicant application entity 535a may be selected at application 532 by clicking on link 612 using an attached mouse.

At step 712, execution service 536 on client 230 retrieves application metadata 545 corresponding to the selected application entity 535 from application 532. For example, if the applicant application entity 535a is selected, then execution service 536 may retrieve corresponding application metadata 545a. At step 714, execution service 536 passes the retrieved application metadata 545a to context service 510.

At step 716, context service 510 matches the selected application entity 535 to associated context entities 515. The matching of entities is discussed in detail above with reference to FIG. 5, and may be performed by, for example, cross referencing the attributes of entities included in application metadata 545 and context metadata 525. For example, context service 510 may match the applicant application entity 535a to context entity 515a based on common attributes.

At step 718, context service 510 identifies associated service entities 215 from which the associated context entities 515 are derived. For example, context service 510 may identify that context entity 515a is derived from the applicant service entity 215a and the loan service entity 215b.

At step 720, context service 510 examines context metadata 525 to determine static actions available on the associated service entities 215. Context service 510 may generate a graph of the associated service entities 215, the relationships to those entities, and the static actions available on those entities and relationships.

At step 722, context service 510 queries action service 520 to determine dynamic actions available on the associated service entities 215. Action service 520 provides the available actions on service entities 215 as well as any actions which may result in a conflict. Action service 520 may also provide limitations on multiple use of the same or multiple dynamic actions from the same process.

At step 724, context service 510 provides the available actions to execution service 536. Context service 510 may also provide other service metadata 505 for the associated service entities 215. If access to one of the associated service entities 215 is restricted, then the user may be required to provide authorization to receive metadata for that entity. For example, the user may be required to log in with an identifier or password.

At step 726, execution service 536 generates a display of the actions available on the associated service entities 215. Execution service 536 includes state and relationship view mechanism 538 to provide views of relationships between related service entities 215. Such relationships may be filtered to provide only those that are relevant to determine functions of state involved in conflict protection. State and relationship view mechanism 512 may provide information about the state of taking, success, failure, and current status of state change methods for related service entities 215.

Figure 8:
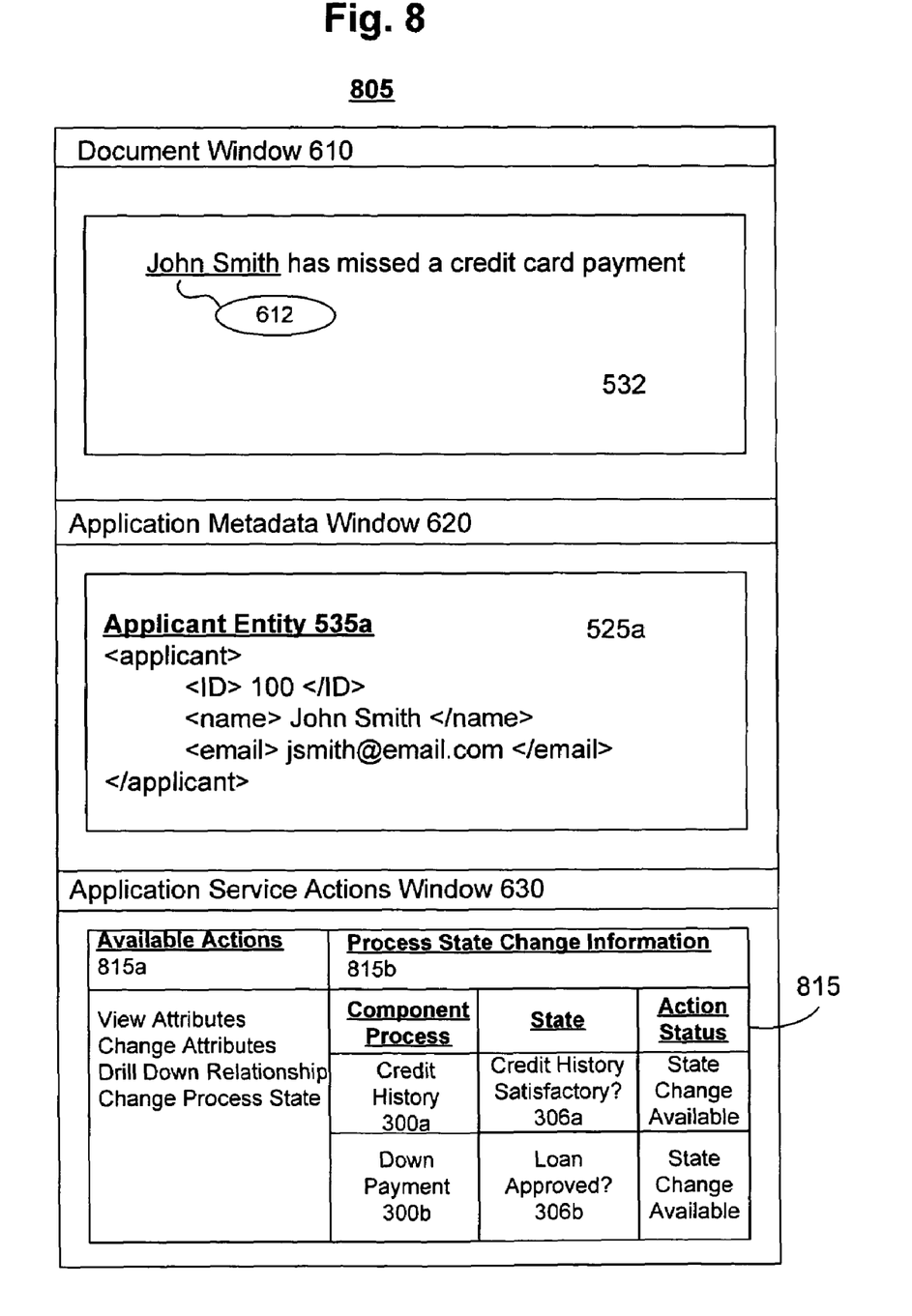
FIG. 8 shows an exemplary application user interface including available actions in accordance with the present invention.

Referring now to FIG. 8, display 815 shows the actions available on the associated service entities 215. The Display 815 is shown in application service actions window 630. The display 815 includes a first display portion 815b showing the available static and dynamic actions for associated service entities 215a and 215b. The display 815 also includes a second display portion 815b showing information about the availability of actions at application services 210. Second display portion 815b shows relationships between component processes 300a and 300b, the state of each component process 300a and 300b, and the availability of actions on applicant service entity 215a and loan service entity 215b within each process 300a and 300b, respectively. Information about the success, failure, and status of pending actions within processes 300a and 300b may be displayed by, for example, clicking on the process in display 815 with an attached mouse.

Alternatively, the available actions may be displayed as a cascading menu set or as sets of categorized actions and options. Furthermore, the available actions may be displayed in a dialog box within document window 610. Execution service 536 may also invoke dialogs and rendering mechanisms specified by context service 510.

At step 728, a user may request an action from the display 815. The user may request the action by, for example, clicking on the action with the attached mouse. If, for example, the user selects "View Attributes" or "Change Attributes", then the attributes of the associated service entities 215a and 215b may appear in a new window or dialog box within user interface 805. The user may then view and change the attributes.

In an alternative embodiment, execution service 536 may perform available actions automatically without displaying such actions to the user.

At step 730, the requested action is forwarded to the appropriate application service 210. If a requested action is a static action, then it may be forwarded to the appropriate application services 210 via context service 510. If the requested action is a dynamic action, then it may be forwarded to the appropriate application services 210 via action service 520.

At step 732, the action may be performed at the appropriate application service 210. The performance of the action may be logged by tracking mechanism 522.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather should be construed in breadth and scope in accordance with the appended claims.

What is claimed:

1. A method comprising:

classifying actions associated with first and second service entities, the first service entity being associated with a first application service and the second service entity being associated with a second application service different from the first application service, the first service entity of the first application service having first metadata attributes associated therewith and the second service entity of the second application service having second metadata attributes associated therewith, the first metadata attributes describing a format of data of the first service entity and actions available to be performed on the first service entity, and the second metadata attributes describing a format of data of the second service entity and actions available to be performed on the second service entity, the first metadata attributes of the first service entity being different from the second metadata attributes of the second service entity, wherein each action is classified according to its availability, wherein classifying an action comprises classifying an action as available according to a rule comprising at least one of a maximum number of times which an action can be performed, a time period in which an action must be performed, a user or class of users which must perform an action, a condition which must occur before performance of an action, or a condition which must occur after performance of an action;

running a context service that matches the first and second service entities despite the different first and second metadata attributes thereof, the context service matching the first and second entities by cross-referencing the first and second metadata attributes thereof to identify actual and/or potential relationships, the context service upon matching the first and second service entities consolidating the matching first and second service entities into a single consolidated context entity and consolidating the first and second metadata attributes into a single consolidated set of metadata attributes describing a format of data of the single consolidated context entity and actions available to be performed on the single consolidated context entity;

determining with reference to the consolidated set of metadata attributes that an action is available to be performed based on a corresponding classification of the availability of the action for each of the matched first and second service entities; and displaying the action available to be performed.

2. The method of claim 1, wherein classifying the actions comprises classifying the actions as optimistically available.

3. The method of claim 2, wherein classifying the actions as optimistically available comprises classifying the actions as available subject to a rule.

4. The method of claim 1, wherein classifying the actions as available according to a rule comprises classifying the actions as being available only if the rule is complied with.

5. The method of claim 1, wherein the classifying the actions comprises classifying the actions as universally available.

6. The method of claim 1, wherein determining if an action is available comprises determining if performance of the action will result in a conflict.

7. The method of claim 1, further comprising consolidating the first and second service entities into a context entity and matching an application entity to the context entity.

8. The method of claim 7, further comprising providing a view at an application of the actions available to be performed on each of the first and second service entities at the application services.

9. A method for providing to an application an action available to be performed on a first service entity at a first application service, the method comprising:

running a context service that matches a second service entity to an associated context entity derived from the first service entity, the first service entity being associated with a first application service and the second service entity being associated with a second application service different from the first application service, the first service entity of the first application service having first metadata attributes associated therewith and the second service entity of the second application service having second metadata attributes associated therewith, the first metadata attributes describing a format of data of the first service entity and actions available to be performed on the first service entity, wherein determining if the action is available to be performed on the first service entity is based on a classification that the action is available according to a rule comprising at least one of a maximum number of times which an action can be performed, a time period in which an action must be performed, a user or class of users which must perform an action, a condition which must occur before performance of an action, or a condition which must occur after performance of an action, and the second metadata attributes describing a format of data of the second service entity and actions available to be performed on the second service entity, the first metadata attributes of the first service entity being different from the second metadata attributes of the second service entity, the matching of the first and second service entities being performed despite the different first and second metadata attributes thereof, the first service entity being extensible markup language data associated with the first application service and the second service entity being extensible markup language data associated with the second application service, wherein the first application service is connected via a network to the second application service, the context service matching the first and second entities by cross-referencing the first and second metadata attributes thereof to identify actual and/or potential relationships, the context service upon matching the first and second service entities consolidating the matching first and second service entities into a single consolidated context entity and consolidating the first and second metadata attributes into a single consolidated set of metadata attributes describing a format of data of the single consolidated context entity and actions available to be performed on the single consolidated context entity;

identifying that the associated context entity is derived from the first service entity;

in response to a selection of the first service entity, determining with reference to the consolidated set of metadata attributes that an action is available to be performed on the matched first service entity at the first application service based on a classification of the action according to its availability; and displaying the action available to be performed.

10. The method of claim 9, comprising identifying that the associated context entity is derived from the first service entity and the second service entity at the second application service, the first service entity being related to the second service entity.

11. The method of claim 9, comprising determining if the action is available to be performed on the first service entity at the first application service based on a classification that the action is optimistically available.

12. The method of claim 11, comprising determining if the action is available to be performed on the first service entity at the first application service based on a classification that the action is available subject to a rule.

13. The method of claim 9, comprising determining if the action is available to be performed on the first service entity at the first application service based on a classification that the action is available only if the rule is complied with.

14. The method of claim 9, comprising determining if the action is available to be performed on the first service entity at the first application service on a classification that the action is universally available.

15. The method of claim 9, wherein determining if the action is available to be performed on the first service entity comprises determining if performance of the action on the first service entity will result in a conflict.

16. The method of claim 9, further comprising generating a view of the action at the application.

17. A system for determining if a first action and a second action are available to be performed in connection with a computer-implemented context entity, the computer-implemented context entity derived from a first service entity at a first application service, wherein determining if the action is available to be performed on the first service entity is based on a classification that the action is available according to a rule comprising at least one of a maximum number of times which an action can be performed, a time period in which an action must be performed, a user or class of users which must perform an action, a condition which must occur before performance of an action, or a condition which must occur after performance of an action, and a second service entity at a second application service, the first service entity being related to the second service entity, the first service entity of the first application service having first metadata attributes associated therewith and the second service entity of the second application service having second metadata attributes associated therewith, the first metadata attributes describing a format of data of the first service entity and actions available to be performed on the first service entity, and the second metadata attributes describing a format of data of the second service entity and actions available to be performed on the second service entity, the first metadata attributes of the first service entity being different from the second metadata attributes of the second service entity, the system comprising:

the first application service, said first application service classifying the first action and providing the classification of the first action to an action service, the first action classified according to its availability to be performed on the first service entity at the first application service;

the second application service, said second application service classifying the second action and providing the classification of the second action to the action service, the second action classified according to its availability to be performed on the second service entity at the second application service;

the action service, said action service determining if the first action and the second action are available based on the classification of the first action the classification of the second action; and a context service, said context service matching the first and the second service entities despite the different first and second metadata attributes thereof, consolidating the first and the second service entities into the computer-implemented context entity, and querying the action service to determine that the first action is available and the second action is available for each of the matched first and second service entities, the context service matching the first and second entities by cross-referencing the first and second metadata attributes thereof to identify actual and/or potential relationships, the context service upon matching the first and second service entities consolidating the matching first and second service entities into the computer-implemented context entity as a single consolidated context entity and consolidating the first and second metadata attributes into a single consolidated set of metadata attributes describing a format of data of the single consolidated context entity and actions available to be performed on the single consolidated context entity, the action service determining if the first action and the second action are available with reference to the consolidated set of metadata attributes.

18. The system of claim 17, wherein said action service comprises a conflict protection mechanism to determine if performance of the first and the second action will result in a conflict.

19. The system of claim 17, wherein said action service comprises a tracking mechanism to track performance of the first and the second actions.

20. The system of claim 17, further comprising an application, said application managing an application entity that is matched to the context entity.

21. The system of claim 20, wherein said application comprises a state and relationship view mechanism for displaying a view of the first and the second actions.

* * * * *